United States Patent Office 3,763,113
Patented Oct. 2, 1973

3,763,113
POLYAMIDES
Harold George Burrows and Stephen John Hepworth, both of Hexagon House, Blackley, Manchester, England
No Drawing. Filed June 15, 1966, Ser. No. 557,639
Claims priority, application Great Britain, June 23, 1965, 26,596/65
Int. Cl. C08g 20/40
U.S. Cl. 260—78 SC                                    5 Claims

ABSTRACT OF THE DISCLOSURE

A method for increasing the molecular weight of a polyamide and the composition produced thereby, comprising heating a polyamide in the presence of a phosphonic acid material at an elevated temperature for a period of time sufficient to increase the relative viscosity of the polyamide. The process is particularly useful for finishing polyamide fiber-forming and molding compositions to a high relative viscosity while avoiding undesirable degradation of the polymer.

This invention relates to polyamides and more particularly it relates to a method for increasing the molecular weight of polyamides.

According to the invention there is provided a process for increasing the molecular weight of polyamides which comprises heating a polyamide, which contains recurring —CONH—X—NHCO—X¹— units wherein X is an alkylene radical and X¹ is an akylene or phenylene radical, in the presence of a phosphonic acid of the formula:

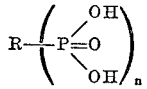

wherein $n$ is 1, 2 or 3, and $R^1$ is a mono-, di- or tri-valent organic radical depending on the value of $n$.

The process of the invention can be conveniently carried out by heating the polyamide and the phosphonic acid together, preferably at a temperature above the melting point of the polyamide until the required increase in the molecular weight of the polyamide is obtained. The reaction is preferably carried out in the absence of air, for example in the presence of an inert gas such as nitrogen. The process can be carried out by either a batch or dis-continuous process, for example by carrying out the process in a sealed vessel, or by a continuous process, for example in a melt extruder, such as is described in British specifications Nos. 886,635, 924,630 and 964,822.

The amount of the phosphonic acid which is used in the process of the invention is preferably between 0.1% and 5.0% by weight of the polyamide.

The said organic radicals represented by $R^1$, which are attached to the phosphorus atom through a carbon atom of said radical, are preferably mono-, di- or tri-valent aliphatic, cycloaliphatic, aryl, aralkyl or aralkenyl radicals, or such radicals in which a carbon atom is replaced by a hetero atom, in particular the nitrogen atom. The said aliphatic radicals are preferably mono-, di- or tri-valent alkane or alkene radicals containing up to 12 carbon atoms such as vinyl, methyl, ethyl, propyl, butyl, hexyl, octyl, decyl, dodecyl, ethylene, trimethylene, propylene, tetramethylene, hexamethylene and 1:3:5-pentyl radicals. The said cycloaliphatic radicals are preferably monovalent cyclohexyl and C-methylcyclohexyl radicals. The said aralkyl or aralkenyl radicals are preferably monovalent monocyclic aryl lower alkyl or alkenyl radicals such as benzyl, β-phenylethyl and β-phenylvinyl radicals. The said aryl radicals are preferably mono-, di- or tri-valent benzene or naphthalene radicals such as phenyl, tolyl, 1- or 2-naphthyl, 1:4-naphthylene, 1:3- or 1:4-phenylene and 1:5:8-naphthylene radicals. Such aryl radicals can in addition contain other substituents such as chlorine atoms. As examples of the said radicals in which one of the carbon atoms is replaced by a nitrogen atom there may be mentioned radicals of 5- or 6-membered nitrogen containing heterocyclic rings such as the piperidino radical, and alkane radicals having one of the carbon atoms replaced by a nitrogen atom such as alkyl—NH—alkylene radicals, for example the β-(ethylamino)ethyl radical.

As specific examples of phosphonic acids which can be used in the process of the invention there may be mentioned methylphosphonic acid ethylphosphonic acid, n-propylphosphonic acid, cyclohexylphosphonic acid, phenylphosphonic acid, β-phenylethylphosphonic acid, p-tolylphosphonic acid, p-chlorophenylphosphonic acid, 1:4-butane diphosphonic acid, 1:5-pentane diphosphonic acid, 1:4-cyclohexane diphosphonic acid, p-benzene diphosphonic acid, p-xylyldiphosphonic acid, 1:3:5-pentane triphosphonic acid and naphthalene 3:6:8-triphosphonic acid.

It is however preferred that the phosphonic acid is a phosphonic acid of the formula:

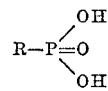

wherein R is a monovalent organic radical, preferably an alkyl, cycloalkyl, aralkyl or aryl radical, and above all a lower alkyl, a cycohexyl, a monocyclic aryl lower alkyl or a monocyclic aryl radical.

Throughout this specification the term "lower alkyl" is used to denote alkyl radicals containing from 1 to 4 carbon atoms.

The polyamides used in the process of the invention are themselves obtained, in known manner, by polymerising substantially equimolecular proportions of an alkylene diamine which contains at least two carbon atoms between the amino groups and an alkylene or phenylene dicarboxylic acid which contains at least two carbon atoms between the carboxylic acid groups.

As examples of the said alkylene diamines there may be mentioned diamines of the general formula

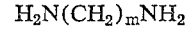

wherein $m$ is an integer of from 2 to 12, such as trimethylenediamine, tetramethylenediamine, pentamethylenediamine, octamethylenediamine and, above all, hexamethylenediamine.

As examples of the said dicarboxylic acids there may be mentioned terephthalic acid and isophthalic acid, and preferably the dicarboxylic acids of the formula

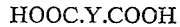

wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired the polyamides used in the process of the invention can contain conventional additives such as delustrants, fillers, light stabilisers or heat stabilisers.

The preferred polyamide for use in the process of the invention is polyhexamethyleneadipamide.

The process of the invention results in the production of polyamides of high molecular weight which are particularly valuable for use in tyre cords and in the production of moulding powders or extruded articles.

The invention is illustrated but not limited by the following examples in which the parts and percentages are by weight.

EXAMPLE 1

50 parts of polyhexamethylene adipamide of relative viscosity 35.2 (determined as an 8.4% solution in 90% formic acid at 25° C.) and 0.36 part of cyclohexylphosphonic acid are heated for 10 minutes at 290° C. under an atmosphere of nitrogen. The resulting polymer has a relative viscosity of 64.3. When the above procedure was repeated except that the cyclohexylphosphonic acid was omitted a polymer of a relative viscosity of 41.0 was obtained.

The following table gives further examples illustrating the invention which were carried out by similarly heating 50 parts of polyhexamethylene adipamide of a relative viscosity of 35.2 with the quantities of the phosphonic acids listed in the second column of the table using the conditions specified in the third column of the table. The fourth column of the table lists the relative viscosities of the resulting polymers.

We claim:
1. Process for increasing the molecular weight of polyamides which comprises heating a molten polyamide which contains recurring —CONH—X—NHCO—X¹— units, wherein X is an alkylene radical and X¹ is selected from the class consisting of alkylene and phenylene radicals, in the presence of 0.1 to 5.0 percent by weight of said polyamide of a phosphonic acid of the formula:

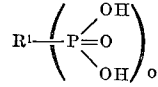

wherein R¹ is a n-valent organic radical, and $n$ is an integer of from 1 to 3 at an elevated temperature for a period of time sufficient to substantially increase the relative viscosity of said polyamide.

2. Process as claimed in claim 1 wherein the polyamide is polyhexamethylene adipamide.

3. Process as claimed in claim 1 wherein the phosphonic acid is a lower alkylphosphonic acid.

4. Process as claimed in Claim 1 wherein the phosphonic acid is cyclohexylphosphonic acid.

5. Process as claimed in claim 1 wherein the phosphonic acid is a monocyclic arylphosphonic acid.

| Example | Phosphonic acid | Conditions | Relative viscosity |
|---|---|---|---|
| 2 | 0.9 part of cyclohexylphosphonic acid | 10 minutes at 290° C | 67.5 |
| 3 | 0.36 part of cyclohexylphosphonic acid | do | (¹) |
| 4 | 0.175 part of phenylphosphonic acid | do | 60.2 |
| 5 | 0.088 part of phenylphosphonic acid | 30 minutes at 290° C | (¹) |
| 6 | 0.21 part of methylphosphonic acid | 10 minutes at 290° C | 58.9 |
| 7 | 0.21 part of p-chlorophenylphosphonic acid | 20 minutes at 290° C | 71.4 |
| 8 | 0.185 part of 1-piperidinophosphonic acid | 10 minutes at 290° C | 61.7 |
| 9 | 0.12 part of 1:4-butanediphosphonic acid | 20 minutes at 290° C | 74.3 |
| 10 | 0.69 part of diphenyl-4:4'-diphosphonic acid | 10 minutes at 290° C | 67.2 |

¹ The relative viscosity of this polyamide was too high to be measured.

References Cited
UNITED STATES PATENTS

| | | | |
|---|---|---|---|
| 3,509,107 | 4/1970 | Brignae | 260—78 |
| 2,510,777 | 6/1950 | Gray | 260—78 |
| 3,235,534 | 2/1966 | Brinkman et al. | 260—78 |
| 3,365,428 | 1/1968 | Wujciak | 260—78 |
| 2,557,808 | 6/1951 | Walker | 260—78 |

OTHER REFERENCES

Gefter—Organo Phosphorus Monomers and Polymers, 1962, pp. X—XIII.

HAROLD D. ANDERSON, Primary Examiner

U.S. Cl. X.R.

260—78 R, 78 S